United States Patent [19]

Earls et al.

[11] Patent Number: 5,270,406

[45] Date of Patent: Dec. 14, 1993

[54] ADVANCED EPOXY RESIN COMPOSITIONS CONTAINING MESOGENIC MOIETIES

[75] Inventors: Jimmy D. Earls; Paul M. Puckett; Robert E. Hefner, Jr., all of Lake Jackson, Tex.

[73] Assignee: The Dow Chemical Company, Midland, Mich.

[21] Appl. No.: 945,312

[22] Filed: Sep. 15, 1992

Related U.S. Application Data

[63] Continuation-in-part of Ser. No. 834,033, Feb. 11, 1992, abandoned, which is a continuation-in-part of Ser. No. 620,509, Nov. 11, 1990, abandoned, which is a continuation-in-part of Ser. No. 553,930, Jul. 13, 1990, abandoned, which is a continuation-in-part of Ser. No. 297,896, Jan. 17, 1989, abandoned.

[51] Int. Cl.$^5$ ............... C08L 63/02; C08G 59/44; C08G 59/50; C08G 59/62

[52] U.S. Cl. ................ 525/481; 525/523; 525/533; 252/299.01; 252/299.64; 252/299.68; 528/96; 528/97; 528/98; 528/99; 528/100; 528/101; 528/104; 528/107; 528/109; 528/112; 528/113; 528/117; 528/118; 528/120; 528/122; 528/123; 528/124

[58] Field of Search ............ 528/96, 97, 98, 99, 528/100101, 104, 107, 109, 112, 113, 117, 118, 120, 122, 123, 124; 525/523, 533, 481; 252/299.01, 299.64, 299.68

[56] References Cited

U.S. PATENT DOCUMENTS

| | | | |
|---|---|---|---|
| 3,249,439 | 5/1966 | Bugel | 528/98 |
| 3,298,998 | 1/1967 | McConnell | 528/98 |
| 3,383,360 | 5/1968 | Harrison | 528/99 |
| 3,408,407 | 10/1968 | Cotter et al. | 528/98 |
| 4,609,719 | 9/1986 | Chatta | 528/98 |
| 4,611,046 | 9/1986 | Chatta | 528/98 |
| 4,611,047 | 9/1986 | Chatta | 528/114 |
| 4,762,901 | 8/1988 | Dhein et al. | 528/73 |
| 4,764,581 | 8/1988 | Muller et al. | 528/100 |
| 5,093,471 | 3/1992 | West | 528/118 |

FOREIGN PATENT DOCUMENTS

| | | |
|---|---|---|
| 0361852 | 4/1990 | European Pat. Off. . |
| 361853 | 4/1990 | European Pat. Off. . |
| 211799A | 7/1984 | Fed. Rep. of Germany . |

OTHER PUBLICATIONS

C. Noel & P. Navard, Prog. Polym. Sci., 16, 55–110 (1991).

C. K. Ober & R. A. Weiss, "Liquid Crystalline Polymers", R. A. Weiss and C. K. Ober (eds), ACS Symp. Series 435, Am. Chem. Soc., Washington D.C. pp. 1–13 (1990).

ACS Symposium Series 114, Chapter 17, pp. 259–262, (given Sep. 1978, at the 176th meeting of the American Chemical Society by James R. Griffith).

Primary Examiner—John C. Bleutge
Assistant Examiner—D. R. Wilson

[57] ABSTRACT

Advanced epoxy resin compositions are prepared by reacting epoxy resins with active hydrogen-containing compounds which contain mesogenic moieties. Curable compositions containing these advanced epoxy resin compositions are useful in adhesives, coatings, laminates castings and the like.

24 Claims, No Drawings

ADVANCED EPOXY RESIN COMPOSITIONS CONTAINING MESOGENIC MOIETIES

CROSS-REFERENCE TO RELATED APPLICATION

This application is a continuation-in-part of application Ser. No. 07/834,033 filed Feb. 11, 1992 (now abandoned) which is a continuation-in-part of application Ser. No. 07/620,509 filed Nov. 11, 1990 (now abandoned), which is a continuation-in-part of application Ser. No. 07/553,930 filed Jul. 13, 1990 (now abandoned), which is a continuation-in-part of application Ser. No. 07/297,896 filed Jan. 17, 1989 (now abandoned), all of which are incorporated herein by reference in their entirety.

FIELD OF THE INVENTION

The present invention concerns advanced resin compositions containing mesogenic moieties, curable compositions and cured compositions thereof.

BACKGROUND OF THE INVENTION

Epoxy resins are useful in many applications such as adhesives, coatings, castings, laminates, composites and the like. In each of these applications, it is desirable to have epoxy resins with improved physical and/or thermal properties.

The present invention provides advanced resin compositions with improved properties through the incorporation of mesogenic (liquid crystalline type) structures into the polymer chain. These resins are obtained through advancement reactions with mesogenic compounds containing active hydrogens. The typical structure of the mesogenic compounds consists of two or more aromatic rings bridged by a rigid, central linkage. The active hydrogen sites are provided by hydroxyl, amine, amide and/or carboxylic acid functionality.

An additional aspect of the present invention is that the property improvements which are obtained with these resins can be further enhanced by the application of electric and magnetic fields and shear stresses during processing and/or cure.

SUMMARY OF THE INVENTION

One aspect of the present invention pertains to advanced resin compositions prepared by reacting (A) an epoxy resin having an average of more than one vicinal epoxy group per molecule with (B) a compound having an average of more than one active hydrogen atom per molecule represented by the following Formulas I, II or Formula III

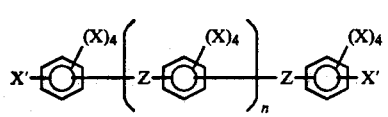

Formula I

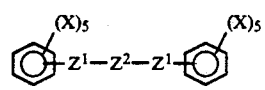

Formula II

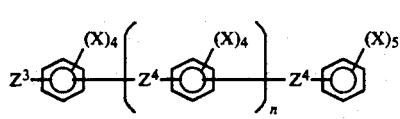

Formula III wherein at least about 80 percent of the Z and X' groups are in the para position with respect to each other in Formula I; at least about 80 percent of the $Z^3$ and $Z^4$ groups are in the para position with respect to each other in Formula III; each X is independently hydrogen, a hydrocarbyl or hydrocarbyloxy group having from 1 to about 12, preferably from about 1 to about 6, most preferably from 1 to about 4, carbon atoms, a halogen atom, $-NO_2$ or $-C\equiv N$; each X' is independently a hydroxyl group, a carboxylic acid group or the group represented by Formula IV

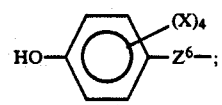

Formula IV each Z is independently $-CR^1=CR^1-$, $-CR=CR^1-CR^1=CR^1-$, $-CR^1=N-N=CR^1-$, $-CR^1=CR^1-CO-O-CH_2-$, $-CR^1=CR^1-CO-O-CH_2-CH_2-$, $-CH_2-O-CO-CR^1=CR^1-$, $-CH_2-CH_2-O-CO-CR^1=CR^1-$, $-O-CO-CR^1=CR^1-$, $-CR^1=CR^1-CO-O-$, $-O-CO-CR^1=CR^1-$, $-N=N-$, $-CO-NR^1-$, $-NR^1-CO-$, $-CO-NR^1-NR^1-CO-$, $-C\equiv C-$, $-C\equiv C-C\equiv C-$, $-CO-S-$, $-S-CO-$, $-CO-O-$, $-O-CO-$, $-CR^1=CR^1-O-CO-CH_2-$, $-CH_2-CO-O-CR^1=CR^1-$, $-CR^1=CR^1-O-CO-CH_2-CH_2-$, $-CH-2-CH_2-CO-O-CR^1=CR^1-$, $-CH_2-CH_2-CO-O-$, $-O-CO-CH_2-CH_2-$, $-CO-O-CR^1=CR^1-$, $-CR^1=CR^1-O-CO-$, a direct single bond when $n \geq 1$,

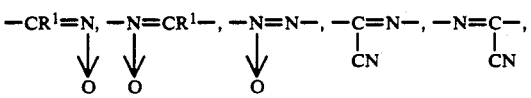

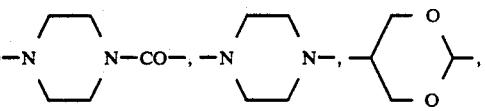

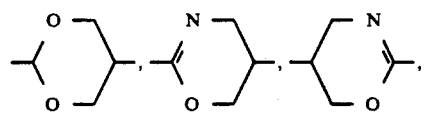

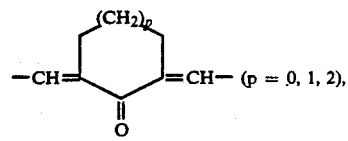

$-CH= \overset{(CH_2)_p}{\underset{\underset{O}{\|}}{\bigcirc}} =CH-$ (p = 0, 1, 2), $-CR^1=\underset{Cl}{\overset{|}{C}}-$, $-\underset{Cl}{\overset{|}{C}}=CR^1-$,

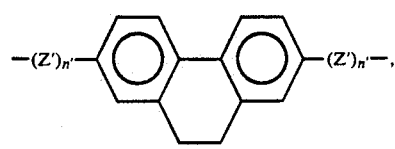

-continued

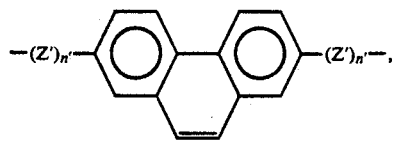

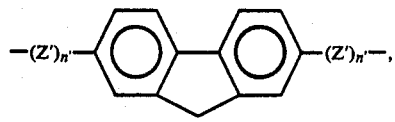

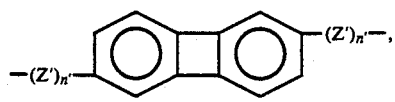

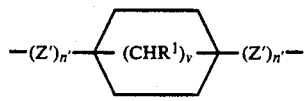

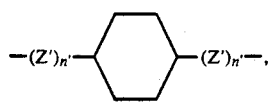

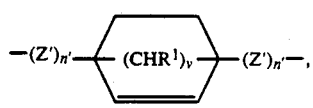

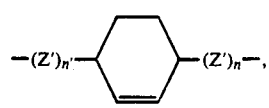

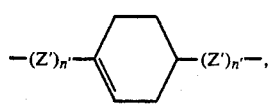

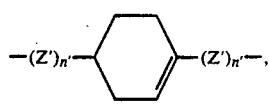

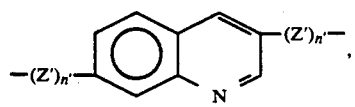

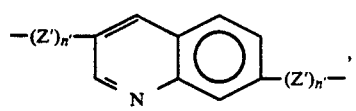

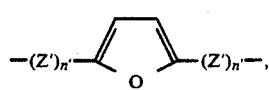

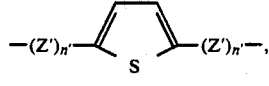

-continued

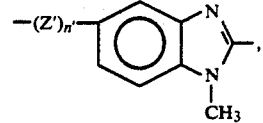

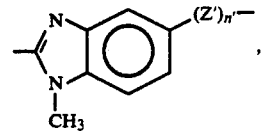

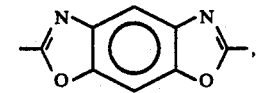

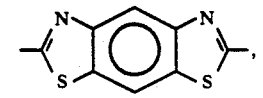

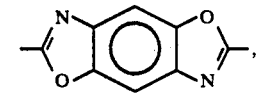

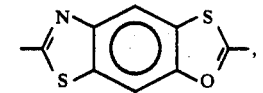

$$-CR^1=C-, \text{ or } -C=CR^1-;$$
$$\quad\quad\quad\; | \quad\quad\quad\quad\; |$$
$$\quad\quad\quad CN \quad\quad\quad\; CN$$

Z' is independently —O—CO—, —CO—O—, —NR$^1$—CO—, or —CO—NR$^1$—; each n' is independently zero or 1; R$^1$ is independently a hydrogen atom or an alkyl group having from 1 to about 4 carbon atoms; Z$^6$ is a divalent hydrocarbyl group having from 1 to about 12, preferably from 1 to about 6, more preferably from 1 to about 4, carbon atoms, —SO—, —SO$_2$—, —S—, —S—S—, —O—, or —CO—; each Z$^1$ is independently —CO—NH—, or —NH—CO—; Z$^2$ is a group represented by a cyclic or bicyclic ring system containing from 5 to about 12, preferably from 5 to about 10, more preferably from 5 to about 6 carbon atoms or a group represented by Formula V

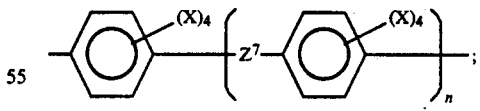

Z$^3$ is NH$_2$—, NH$_2$—SO$_2$—, NH$_2$—CO—, NH$_2$—Z$^5$—O—CO—, or NH$_2$—Z$^5$—O—; each Z$^4$ is independently —CR$^1$=CR$^1$—, —CR$^1$=CR$^1$—CR$^1$=CR$^1$—, —CR$^1$=N—N=CR$^1$—, —CR$^1$=CR$^1$—CO—O—CH$_2$—, —CR$^1$=CR$^1$—CO—O—CH$_2$—CH$_2$—, —CH$_2$—O—CO—CR$^1$=CR$^1$—, —CH$_2$—CH$_2$—CH$_2$—O—CO—CR$^1$=CR$^2$—, —CR$^1$=CR$^1$—CO—O—, —O—CO—CR$^1$=CR$^1$—, —N=N—, —CO—NR$^1$—, —NR$^1$—CO—, —CO—NR$^1$—NR$^1$—CO, —≡C—, —C≡C—C≡C—, —CO—S—, —S—CO—, —DR$^1$=N—, —N=CR$^1$—, —CO—O—, —O—CO—, —CR¹=CR¹—O—CO—CH₂—, —CH₂—CO—O—CR¹=CR¹—, —CR¹=CR¹—O—CO—CH₂—CH₂—, —CH₂—CH₂—CO—O—CR¹=CR¹—, —CH₂—CH₂—CO—O—, —O—CO—CH₂—CH₂—, —CO—O—CR¹=CR¹—, —CR¹=CR¹—O—CO—, a direct single bond,
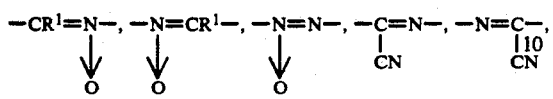
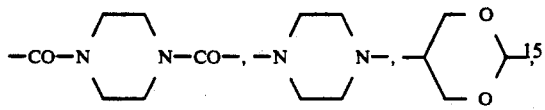
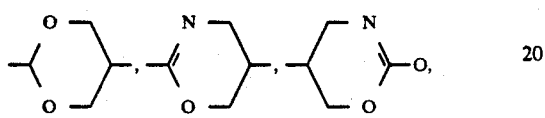
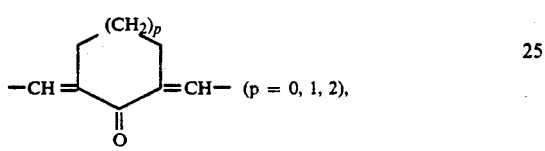
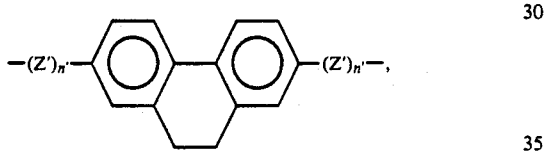
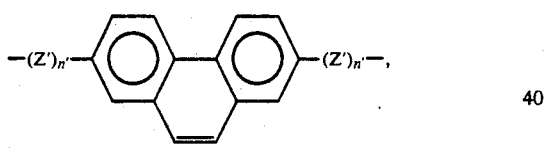
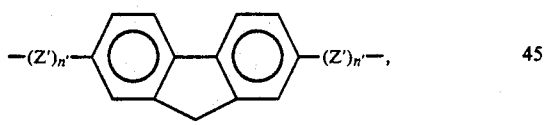
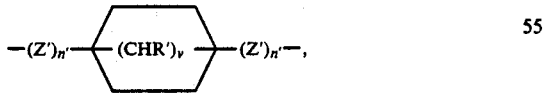
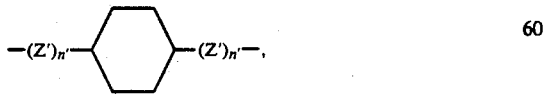
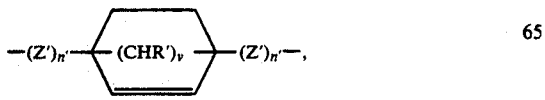
-continued
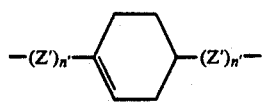
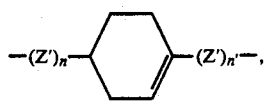
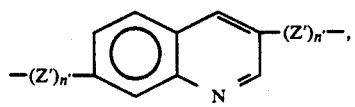
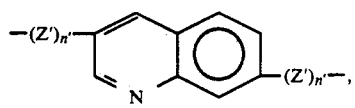
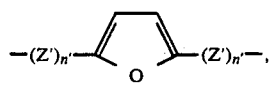
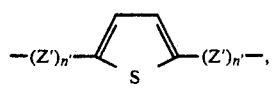
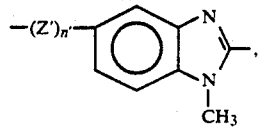
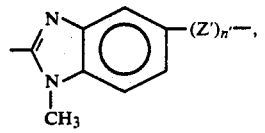
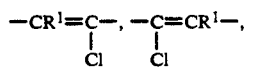
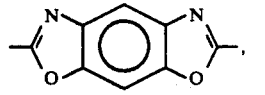
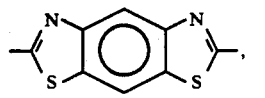
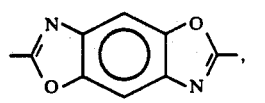

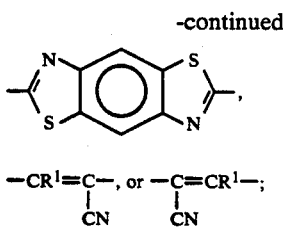

$-CR^1=C-$, or $-C=CR^1-$;
       |              |
       CN             CN $Z^5$ is an alkylene or cycloalkylene group having from 1 to about 10, preferably from 1 to about 6, more preferably from 1 to about 3 carbon atoms; $Z^7$ is the same as $Z^4$ with the proviso that it can also independently be a divalent hydrocarbyl group having from 1 to about 12, preferably from 1 to about 6, more preferably from 1 to about 4 carbon atoms, —SO—, —SO$_2$—, —S—, —S—S—, —O—, or —CO—; v has a value of 1 or 2, and n has an average value of zero to about 6; with the proviso that (a) at least about 80 percent of the Z and X' groups are in the para position with respect to each other in Formula I, (b) at least about 80 percent of the $Z^3$ and $Z^4$ groups are in the para position with respect to each other in Formula III, (c) component (B) cannot be a compound represented by the formula

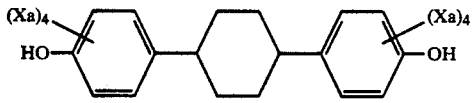

wherein each $X^a$ is independently hydrogen, hydroxyl, a nitro, alkyl, aryl, alkaryl, aralkyl, halogen, alkoxy alkaryloxy, aralkyloxy or aryloxy group and, (d) when component (B) is a compound represented by Formula III wherein $Z^3$ is NH$_2$—Z$_5$—O— or NH$_2$—Z$_5$—O—CO—, Z$_5$ is an alkyl group having from 1 to 10 carbon atoms, $Z^4$ is a direct single bond, n has a value of zero, X is hydrogen at all occurrences with the proviso that the single X substituent on the aromatic ring not substituted by $Z^3$ para to the direct single bond is —NO$_2$ or —CN and with the proviso that $Z^3$ is para to the direct single bond, components (A) and (B) are employed in amounts which provide a ratio of amine hydrogen atoms per vicinal epoxy group of from about 0.01:1 to 0.95:1; and wherein components (A) and (B) are employed in amounts which provide a ratio of active hydrogen atoms per vicinal epoxy group of from about 0.01:1 to about 1.05:1.

Another aspect of the present invention pertains to curable compositions comprising the aforementioned advanced resin compositions and a curing amount of a suitable curing agent or curing catalyst therefor.

A further aspect of the present invention pertains to products or articles resulting from curing the aforementioned curable compositions.

A still further aspect of the present invention pertains to products resulting from the application of an electric field, magnetic field, drawing and/or shear flow during curing or processing of the aforementioned advanced epoxy resin compounds.

The advanced resin compositions of the present invention provide cured products having an improvement in one or more of the physical or thermal properties such as, but not limited to, one or more of the following: glass transition temperature, tensile strength, tensile modulus, flexural strength, flexural modulus and the like.

The present invention may suitably comprise, consist of, or consist essentially of, the components enumerated therein.

The invention illustratively disclosed herein suitably may be practiced in the absence of any component or compound which is not specifically disclosed or enumerated herein and any of the compounds may contain or be free of any substituent group not specifically named herein.

DETAILED DESCRIPTION OF THE INVENTION

The term "mesogenic" as is used herein designates compounds containing one or more rigid rodlike structural units which have been found to favor the formation of liquid crystal phases in the case of low molar mass substances. Thus the mesogen or mesogenic moiety is that structure responsible for molecular ordering.

The term "hydrocarbyll" as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated.

Likewise, the term "hydrocarbyloxyl" means a hydrocarbyl group having an oxygen linkage between it and the carbon atom to which it is attached.

The term "active hydrogen atom" as employed herein means that the hydrogen atom is reactive with a vicinal epoxide group.

The term "processing" as employed herein means that the orientation is conducted during the molding, casting, extrusion, pultrusion, prepregging, filming, filament winding and the like.

Particularly suitable compounds having an average of more than one active hydrogen atom per molecule and containing one or more mesogenic moieties which can be employed herein include hydroxyl-containing compounds, carboxylic acid-containing compounds, primary amine-containing compounds and compounds containing more than one aromatic amide group per molecule. These compounds include, for example, those compounds represented by the aforementioned Formulas I, II and III.

Particularly suitable hydroxyl-containing compounds include, for example, bis(4-hydroxyphenyl)terephthalate, N,N'-bis(4-hydroxyphenyl)terephthalamide, bis(4'-hydroxybiphenyl)terephthalate, 4,4'-dihydroxyphenylbenzoate, 4,4'-dihydroxybenzanilide, 4,4"-dihydroxybiphenylbenzoate, 1,4-bis(4'-hydroxyphenyl-1'-carboxamide)benzene, 1,4-bis(4'-hydroxyphenyl-1'-carboxy)benzene, 4,4'-bis(4"-hydroxyphenyl-1"-carboxy)biphenyl, bis(4'-hydroxyphenyl)1,4-benzenediimine, 4,4'-dihydroxy-α-methylstilbene, 4,4'-dihydroxy-α-cyanostilbene, 4,4'-dihydroxystilbene, 4,4'-dihydroxy-2,2'-dimethylazoxybenzene, 4,4'-dihydroxy-α, α'-diethylstilbene, mixtures thereof and the like.

Particularly suitable carboxylic acid-containing compounds include, for example, 4,4'-benzanilide dicarboxylic acid, 4,4'-phenylbenzoate dicarboxylic acid, 4,4'-stilbenedicarboxylic acid and mixtures thereof and the like.

Particularly suitable primary amine-containing compounds include, for example, 4'-sulfonamido-N-phenyl benzamide, 4'-sulfonamido-N'-phenyl-4-chlorobenzamide, 4-amino-1-phenylbenzoate, 4-amino-N-phenylbenzamide, N-phenyl-4-aminophenyl-1-carboxamide, phenyl-4-aminobenzoate, biphenyl-4-aminobenzoate, 1-phenyl-4'-aminophenylterephthalate, mixtures thereof and the like.

Particularly suitable aromatic amide-containing compounds include, for example, N,N'-diphenylterephthalamide, 1,4-benzenediphenylearboxamide, 1,4-cyclohexanediphenylcarboxamide, benzanilide ether, N-phenylbenzamide, mixtures thereof and the like.

Suitable epoxy resins which can be advanced with the aforementioned active hydrogen-containing compounds include those epoxy resins having an aliphatic, cycloaliphatic or aromatic base. These include the polyglycidyl ethers of alkylene glycols, polyoxyalkylene glycols, dihydric phenols including bisphenols and dihydroxybiphenyl as well as substituted derivatives thereof, phenol and substituted phenol aldehyde novolac resins, phenol or substituted phenol hydrocarbon resins. The dihydric phenols and novolac resins and hydrocarbon resins can contain such substituents as hydrocarbyl or hydrocarbyloxy groups containing from 1 to about 10, preferably from 1 to about 6, more preferably from 1 to about 3 carbon atoms, halogen atoms, particularly chlorine or bromine, $-NO_2$, $-C\equiv N$ and the like. Exemplary of such suitable epoxy resins include, for example, those represented by the following Formulas VI, VII, VIII, IX or X and the like.

about 1 to about 6, more preferably from 1 to about 3, carbon atoms, $-O-$, $-S-$, $-S-S-$, $-SO-$, $-SO_2-$, or $-CO-$; each A' is independently a divalent hydrocarbon group having from 1 to about 6, preferably from 1 to about 3, carbon atoms; Q is a single bond, $-CH_2-S-CH_2-$, $-(CH_2)_{n1}-$, or

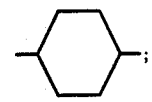

each R is independently hydrogen or an alkyl group having from 1 to about 4 carbon atoms; each $R^2$ and $R^3$ is independently hydrogen, a hydrocarbyl or halohydrocarbyl group having from 1 to about 6, preferably from 1 to about 3, more preferably from 1 to about 2, carbon atoms; each X is independently hydrogen, a hydrocarbyl or hydrocarbyloxy group having from 1 to about 12, preferably from about 1 to about 6, most preferably from 1 to about 4, carbon atoms, a halogen atom, $-NO_2$ or $-C\equiv N$; m has a value from about 1 to about 10, preferably from about 1 to about 4, more preferably from about 1 to about 2; m' has a value from about 0.01 to about 12, preferably from about 1 to about 6, more preferably from about 1 to about 3; $m^1$ has an average value from about 1 to about 12, preferably from about 1 to about 6, more preferably from about 1 to about 3; $m^2$ has a value from about 1 to about 12, preferably from about 2 to about 6, more preferably from about 2 to about 3; n has a value of zero or 1; n' has an average value from about zero to about 3, preferably from about

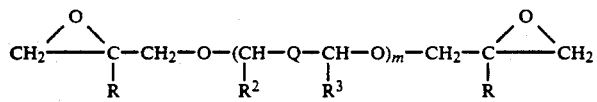

Formula VI

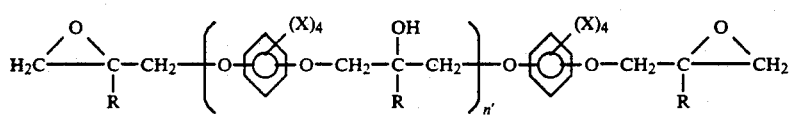

FORMULA VII

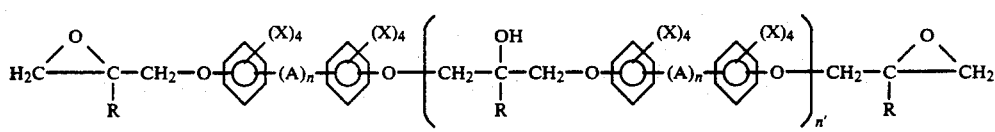

FORMULA VIII

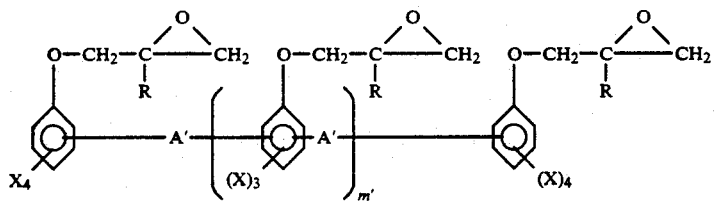

FORMULA IX

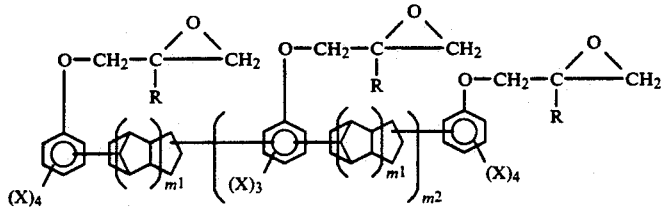

FORMULA X wherein each A is independently a divalent hydrocarbyl group having from 1 to about 12, preferably from zero to about 1.5, more preferably from about zero to about 0.5; and $n^1$ has an average value from about 1 to about 10.

The epoxy resin having an average of more than one vicinal epoxy group per molecule and the compound having an average of more than one active hydrogen atom per molecule and containing one or more mesogenic moieties are reacted in amounts which provide suitably from about 0.01:1 to about 1.05:1, more suitably from about 0.01:1 to about 0.5:1, most suitably from about 0.01:1 to about 0.3:1 active hydrogen atoms per epoxy group.

When the epoxy resin having an average of more than one vicinal epoxy group per molecule and the compound having an average of more than one active hydrogen atom per molecule and containing one or more mesogenic moieties are reacted in amounts which provide from about 0.01:1 to about 0.95:1 active hydrogen atoms per epoxy group, a curable (thermosettable) advanced epoxy resin is produced.

When the epoxy resin having an average of more than one vicinal epoxy group per molecule and the compound having an average of more than one active hydrogen atom per molecule and containing one or more mesogenic structures are reacted in amounts which provide from about 0.96:1 to about 1.05:1 active hydrogen atoms per epoxy group, a substantially thermoplastic, resinous product is produced. Said resin composition contains little, if any, curable residual epoxide functionality, and may thus be processed using the typical processing methods employed with conventional thermoplastics, such as, for example, injection molding or extrusion. Thermosetting may, however, be induced, for example, via reaction of all or a part of the backbone secondary hydroxyl groups produced in the aforesaid advancement reaction, with a curing agent therefor. One class of said curing agents includes the di- or polyisocyanates as well as the blocked di- or polyisocyanates which can be induced to react with said secondary hydroxy groups providing urethane functional crosslinks between the resin chains. An example of a specific diisocyanate especially useful herein is 4,4'-diisocyanatodiphenylmethane. When the compound having an average of more than one active hydrogen atom per molecule used in the advancement reaction is a diphenol, and the ratio bf hydroxyl groups per epoxy group is from about 0.96:1 to about 1.05:1, the resultant resinous product is a phenoxy resin. If desired, the reaction can be conducted in the presence of a suitable catalyst such as, for example, those catalysts described herein for use in the advancement reaction. According to the teachings found in *ENCYCLOPEDIA OF POLYMER SCIENCE AND ENGINEERING*, vol. 6, page 331, published by John Wiley and Sons, New York (1986), which is incorporated here in by reference, aside from the aforementioned advancement method, a phenoxy resin may also be prepared by reaction of a 1:1 mole ratio of high purity bisphenol A and epichlorohydrin. It is therefore operable to prepare the phenoxy resins containing one or more mesogenic moieties of the present invention via reaction of one or more diphenols containing one or more mesogenic moieties with one or more epihalohydrins. A typical example would thus be the phenoxy resin produced from the reaction of epichlorohydrin and bis(4-hydroxyphenyl)terephthalate using the aforementioned stoichiometric ratio. The reaction of the epihalohydrin and the bisphenol is usually conducted at a temperature of from about 0° C. to about 100° C., preferably from about 20° C. to about 80° C., more preferably from about 20° C. to about 65° C. for a time sufficient to complete the reaction, usually from about 1 to about 12, preferably from about 1 to about 5, more preferably from about 1 to about 3, hours.

The advancement reaction can be conducted in the presence of a suitable advancement catalyst such as, for example, phosphines, quaternary ammonium compounds, phosphonium compounds, tertiary amines and the like. Particularly suitable catalysts include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate-acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate-acetic acid complex), butyltriphenylphosphonium tetrabromobisphenate, butyltriphenylphosphonium bisphenate, butyltriphenylphosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 and 4,366,295, all of which are incorporated herein by reference.

The amount of advancement catalyst depends, of course, upon the particular reactants and catalyst employed; however, it is usually employed in quantities of from about 0.03 to about 3, preferably from about 0.03 to about 1.5, most preferably from about 0.05 to about 1.5 percent by weight based upon the weight of the epoxy-containing compound.

The advancement reaction can be conducted at atmospheric, superatmospheric or subatmospheric pressures at temperatures of from about 20° C. to about 260° C., preferably from about 80° C. to about 200° C., more preferably from about 100° C. to about 150° C. The time required to complete the advancement reaction depends upon the temperature employed. Higher temperatures require shorter periods of time whereas lower temperatures require longer periods of time. Generally, however, times of from about 5 minutes to about 24 hours, preferably from about 30 minutes to about 8 hours, more preferably from about 30 minutes to about 3 hours are suitable.

If, desired, the advancement reaction can be conducted in the presence of one or more solvents. Suitable such solvents include, for example, glycol ethers, aliphatic and aromatic hydrocarbons, aliphatic ethers, cyclic ethers, ketones, esters, amides, combinations thereof and the like. Particularly suitable solvents include, for example, toluene, benzene, xylene, methyl ethyl ketone, methyl isobutyl ketone, diethylene glycol methyl ether, dipropylene glycol methyl ether, N,N-dimethylformamide, N-methylpyrrolidinone, tetrahydrofuran, propylene glycol methyl ether, combinations thereof and the like. The solvents can be employed in amounts Of from about zero to about 80%, preferably from about 20% to about 60%, more preferably from about 30% to about 50% by weight based upon the weight of the reaction mixture.

While the advancement of epoxy resins with active hydrogen containing compounds having one or more mesogenic moieties results in improved properties, even more improvement can be obtained if the advanced resin composition is subjected to external fields or induced stresses. These fields or stresses result in the orientation of the advanced resin compositions due to their anisotropic properties. To achieve this orientation during processing, electric or magnetic fields, drawing and/or shear stresses can be applied. The preferred method for orientation is through the application of shear stress. In addition to orientation by electric and magnetic fields, polymeric mesophases can be oriented by low shear rates (0.1-90 sec$^{-1}$) which are induced by drawing and/or flow through dies, orifices, and mold gates. For the potential mesomorphic systems based on the advancement of epoxy resins with active hydrogen containing compounds having one or more mesogenic moieties, shear orientation can be induced by processing methods such as injection molding, extrusion, filament winding, pultrusion and filming at temperatures from about ambient to 200° C., preferably from about ambient to 160° C. and more preferably from about ambient to 120° C. At the time of this processing, an epoxy resin hardener and/or catalyst which would be a part of the final formulated system would set or cure the resin in an oriented, highly ordered state from about 1 minute to 1 hour, preferably from about 1 minute to 30 minutes, and more preferably from about 1 minute to 10 minutes.

The advanced epoxy resins of the present invention can be cured by the conventional means for curing epoxy resins such as by mixing with any suitable curing agent. Suitable such curing agents include, for example, primary and secondary polyamines, carboxylic acids and anhydrides thereof, phenolic hydroxyl-containing compounds, guanidines, urea-aldehyde resins, melamine-aldehyde resins, alkoxylated urea-aldehyde resins, alkoxylated melamine-aldehyde resins, aliphatic, cycloaliphatic and aromatic amines, combinations thereof and the like. Particularly suitable curing agents include, for example, ethylenediamine, diethylenetriamine, triethylenetetramine, tetraethylenepentamine, sulfanilamide, bis(hydroxyphenyl)methane, methylenedianiline, maleic anhydride, chlorendic anhydride, diaminocyclohexane, isophoronediamine, methylbicyclo[2.2.1-]heptene-2,3-dicarboxylic anhydride, phenol-formaldehyde novolac resin, cresol-formaldehyde novolac resin, methylolated urea-formaldehyde resin, methylolated melamine-formaldehyde novolac resin, diethyltoluenediamine, diaminodiphenyl sulfone, combinations thereof and the like. The curing agents are employed in an amount which will effectively cure the composition containing the mesogenic moieties. These amounts will depend upon the particular advanced epoxy resin and curing agent employed; however, suitable amounts include, for example, from about 0.95:1 to about 1.2:1, more suitably from about 0.95:1 to about 1.15:1, most suitably from about 1:1 to about 1.15:1 equivalents of curing agent per epoxide equivalent for those curing agents which cure by reacting with the epoxy group of the epoxy resin. *The Handbook of Epoxy Resins* by Lee and Neville, McGraw-Hill, 1967 contains various discussions concerning the curing of epoxy resins as well as a compilation of suitable curing agents. This handbook is incorporated herein by reference in its entirety.

The advanced resin compositions of the present invention can be blended with other materials such as solvents or diluents, fillers, pigments, dyes, flow modifiers, thickeners, reinforcing agents, mold release agents, wetting agents, stabilizers, fire retardant agents, surfactants, combinations thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based upon the weight of the total blended composition.

Solvents or diluents which can be employed herein include, for example, hydrocarbons, ketones, glycol ethers, aliphatic ethers, cyclic ethers, esters, amides, combinations thereof and the like. Particularly suitable solvents or diluents include, for example, toluene, benzene, xylene, methyl ethyl ketone, methyl isobutyl ketone, diethylene glycol methyl ether, dipropylene glycol methyl ether, dimethylformamide, N-methylpyrrolidinone, tetrahydrofuran, propylene glycol methyl ether, combinations thereof and the like.

The modifiers such as thickeners, flow modifiers and the like can be suitably employed in amounts of from about zero to about 10, more suitably from about 0.5 to about 6, most suitably from about 0.5 to about 4 percent by weight based upon the weight of the total composition.

Reinforcing materials which can be employed herein include natural and synthetic fibers in the form of mats, woven fabric, monofilament, multifilament, unidirectional fiber, rovings, random fibers or filaments, inorganic fillers or whiskers, hollow spheres, and the like. Suitable reinforcing materials include, glass, ceramics, nylon, rayon, cotton, aramid, graphite, polyalkylene terephthalates, polyethylene, polypropylene polyesters, combinations thereof and the like.

Suitable fillers which can be employed herein include, for example, inorganic oxides, ceramic microspheres, plastic microspheres, inorganic whiskers, glass microspheres, $CaCO_3$, combinations thereof and the like.

The fillers can be employed in amounts suitably from about zero to about 95, more suitably from about 10 to about 80, most suitably from about 40 to about 60 percent by weight based upon the weight of the total composition.

The following examples are illustrative of the invention, but are not to be construed as to limiting the scope thereof in any manner.

SYNTHESIS OF N,N'-DIPHENYLTEREPHTHALAMIDE

N,N'-diphenylterephthalamide (Structure I) is synthesized from aniline and terephthaloyl chloride using acetone as a reaction media and an aqueous solution of NaOH to neutralize the HCl generated. Terephthaloyl chloride (87.2 grams, 0.43 moles) is first added to a stirred, 2-liter reaction flask containing one liter of acetone. After the terephthaloyl chloride has dissolved, aniline (80.0 grams, 0.86 moles) is added dropwise using an addition funnel over a 30 minute period. During the course of this addition, a white precipitate is formed. A 200 ml aqueous solution of NaOH (34.3 grams, 0.86 moles) is then added, also using an addition funnel, over a 30 minute period. The reaction temperature during both the aniline and NaOH addition is maintained below 35° C. by blowing air onto the outside of the reaction flask. After the NaOH addition, the reaction mixture is stirred for three hours and then vacuum filtered (filtrate pH=7). The filter cake obtained is washed with 400 ml of acetone and then added to one liter of deionized water, stirred for 15 minutes and filtered. This filter cake is washed with 500 ml of acetone and then dried in a 105° C. vacuum oven to a constant weight. This final product (114.4 grams, yield=84.2%) exhibited a sharp melting endotherm by differential scanning calorimetry (DSC) at 346° C. Also Fourier transform infrared (FTIR) analysis showed the following absorbances which are indicative of the structure for the final product: 3329 cm$^{-1}$ (N—H stretch), 1528 cm$^{-1}$ (Amide II band) and 1650 cm$^{-1}$ (Amide I band).

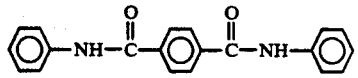

Structure I

SYNTHESIS OF N-PHENYLBENZAMIDE

N-phenylbenzamide (Structure II) is synthesized from aniline and benzoyl chloride using acetone as a reaction media and an aqueous solution of NaOH to neutralize the HCl generated. A 20 ml aqueous solution of NaOH (2.57 grams, 0.064 moles) and 6.0 grams (0.064 moles) of aniline are first added to a stirred 250 ml flask containing 75 ml of acetone. Benzoyl chloride (9.06 grams, 0.064 moles) is next added over a five minute period. This reaction mixture which now contains a white precipitate is stirred for 1.5 hours and then diluted with 50 ml of deionized water. This solution is next filtered and the filter cake obtained is sequentially washed with 50 ml of deionized water (two times) followed by 50 ml of methanol. The washed filter cake is recovered and DCS analysis of this product showed a sharp melting endotherm at 169° C.

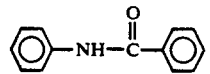

Structure II

SYNTHESIS OF 4'-SULFONAMIDO-N-PHENYLBENZAMIDE

4'-sulfonamido-N-phenylbenzamide (Structure III) is synthesized from sulfanilamide and benzoyl chloride using acetone as a reaction media and an aqueous solution of NaOH to neutralize the HCl generated. Sulfanilamide (100 grams, 0.58 moles) is first added to a stirred, two liter reaction flask containing one liter of acetone. After the sulfanilamide has dissolved, benzoyl chloride (82 grams, 0.58 moles) is added dropwise using an addition funnel over a 20 minute period. During the course of this addition, a white precipitate is formed. A 200 ml aqueous solution of NaOH (23.2 grams, 0.58 moles) is then added, also using an addition funnel, over a 30 minute period. The reaction temperature during this addition and that of the benzoyl chloride is maintained below 30° C. by blowing air onto the outside of the reaction flask. After the NaOH addition, the reaction mixture is stirred for two hours and then vacuum filtered. The filter cake obtained is washed with one liter of deionized water. These solids are next added to 300 ml of acetone, stirred for 15 minutes, and then vacuum filtered. This filter cake is washed with 500 ml of deionized water followed by 300 ml of acetone and then dried to a constant weight in a 100° C. vacuum oven. The final dried product (145 grams, yield=90.2%) exhibited a sharp melting endotherm by DSC at 297° C. Also FTIR analysis of this material showed the following absorbances which are indicative of the structure for the final product: 3350 cm$^{-1}$ (N—H stretch), 1520 cm$^{-1}$ (Amide II band), 1650 cm$^{-1}$ (Amide I band) and 3267 cm$^{-1/3291}$ cm$^{-1}$ (N—H stretch of sulfonamide).

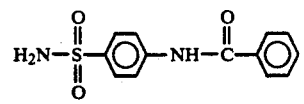

Structure III

SYNTHESIS OF BIS(4-HYDROXYPHENYL)TEREPHTHALATE bis(4-Hydroxyphenyl)terephthalate (Structure IV) is synthesized by the reaction of hydroquinone with terephthaloyl chloride through the addition of NaOH. The hydroquinone (162.7 grams, 1.48 moles) and terephthaloyl chloride (150.0 grams, 0.74 moles) are first dissolved in 750 ml of tetrahydrofuran in a two liter round bottom flask which is stirred. The NaOH (59.1 grams, 1.48 moles) in 300 ml of deionized water is next added dropwise using an addition funnel over a one hour period and the mixture is then allowed to stir an additional two hours at ambient temperature (pH=6). The precipitate obtained is collected by vacuum filtration and then added to 500 ml of deionized water and 1000 ml of methanol. This solution is stirred for one hour at 40°-55° C. and then filtered. The solids collected here are added to 1100 ml of anhydrous methanol and stirred at 40°-55° C. for one hour followed by a third filtration. The resultant solids are then dried in a 80° C. vacuum oven. This final product (111.9 grams, yield=43.3%) exhibited a sharp melting endotherm by DSC at 415° C.

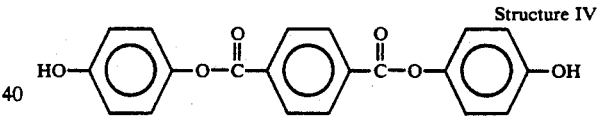

Structure IV

SYNTHESIS OF N,N'-BIS(4-HYDROXYPHENYL)TEREPHTHALAMIDE

N,N'-bis(4-hydroxyphenyl)terephthalamide (Structure V) was synthesized by the reaction of aminophenol with terephthaloyl chloride in the presence of NaHCO$_3$. Two moles of aminophenol (218.3 grams) and 2 moles of NaHCO$_3$ (168 grams) were first added to a stirred, round bottom flask containing 750 milliliters of acetone and 750 milliliters of deionized water. Two moles of terephthaloyl chloride (203.0 grams) were then added over a two hour period. During the course of the terephthaloyl chloride addition, 200 additional milliliters of acetone were also added to wash down the frothy suspension caused by CO$_2$ evolution. After the terephthaloyl chloride addition, the precipitate produced from the reaction was collected by vacuum filtration. For purification of the precipitate obtained, one half of this material was placed in a stirred, round bottom flask containing 900 milliliters of methanol and 450 milliliters of deionized water. This suspension was heated to 56° C. and then vacuum filtered. For the solids recovered from this filtration, the washing step with methanol and deionized water was repeated. The filtrant solids obtained from the second hot filtration were then added to a stirred, round bottom flask containing 1250 milliliters of methanol. This suspension was vacuum filtered after 30 minutes to recover the solids for drying. After following the preceding washing procedure for the second half of the reaction precipitate, the total solids recovered were dried at 80° C. under vacuum for 5 hours. The weight of the dried solids was 325.6 grams, 93.4 percent of the theoretical yield to N,N'-bis(4-hydroxyphenyl)terephthalamide. The melting point of this final product was 405° C. as determined by DSC.

Structure V:

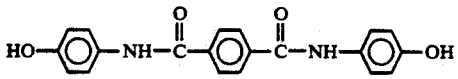

Structure V

COMPARATIVE EXPERIMENT A

Cured Low Molecular Weight Epoxy Resin

A diglycidyl ether of bisphenol A, 149.1 grams having 24.6% epoxide and a 174.8 epoxide equivalent weight (EEW) is heated to 120° C. A conventional epoxy resin hardener, diethyltoluenediamine (39.51 grams, 1.04 times the stoichiometric amount of epoxide) is then added. After mixing, this resin system is poured into a mold (dimensions=8"×8"×⅛"; 203.2 mm×203.2 mm×3.175 mm) heated to 120° C. in a convection oven. The temperature of the oven is then raised to 180° C. After two hours at 180° C., the oven is cooled to room temperature. Following cool down, a void free, neat resin casting is obtained from the mold. Glass transition temperature and mechanical properties for this casting are then determined. These results are reported in Table I and again in Table II for comparison purposes.

COMPARATIVE EXPERIMENT B

Cured Advanced Epoxy Resin with Bisphenol A—Control

A diglycidyl ether of bisphenol A, 150 grams (1 equiv.) having a percent epoxide of 16.3 and an EEW of 263.8 advanced with 25.1 grams (0.25 equiv.) of bisphenol A is heated to 120° C. A stoichiometric amount (29.25 grams) of diethyltoluenediamine is then added. After mixing, this resin system is poured into a mold (dimensions=8"×8"×⅛"; 203.2 mm×203.2 mm×3.175 mm) heated to 120° C. in a convection oven. The temperature of the oven is then raised to 180° C. After five hours at 180° C., the oven is cooled to room temperature. Following cool down, a void free, neat resin casting is obtained from the mold. Glass transition temperature and mechanical properties for this casting are then determined. These results are reported in Table III.

EXAMPLE 1

Advancement of Diglycidyl Ether of Bisphenol A Resin with N,N'-Diphenylterephthalamide N,N'-diphenylterephthalamide (9.00 grams) is added to a stirred, 500 ml reaction flask containing 300.1 grams of a diglycidyl ether of bisphenol A having an EEW of 177.7. A sample of this material when viewed under an optical microscope (70× magnification) using a crosspolarized light source showed dispersed crystallites of the N,N'-diphenylterephthalamide in the epoxy resin. This mixture is then heated to 248° C. and held at this temperature for 1.5 hours. After cooling to room temperature, optical microscopy showed birefringent domains in the epoxy resin. The % epoxide of this advanced resin is 22.7 based on titrametric determination. This % epoxide corresponds to the expected value obtained by calculations based on the complete reaction of the amide hydrogens of N,N'-diphenylterephthalamide.

EXAMPLE 2

Cure of Diglycidyl Ether of Bisphenol A Epoxy Resin Advanced with N,N'-Diphenylterephthalamide Part of the advanced epoxy resin from Example 1 (147.0 grams) is heated to 120° C. Diethyltoluenediamine (35.81 grams, 1.04 times the stoichiometric amount of epoxide) is then added. After mixing, this resin system is poured into a mold (dimensions=8"×8"×⅛") heated to 120° C. in a convection oven. The temperature of the oven is then raised to 180° C. After two hours at 180° C., the oven is cooled to room temperature and a void free, neat resin casting is obtained from the mold. When this casting is viewed under an optical microscope (70× magnification) using a crosspolarized light source, rod-like, birefringent segments are observed which are dispersed throughout the polymer. Glass transition temperature and mechanical properties are then determined for this casting and these results are reported in Table I. Compared to the diglycidyl ether of bisphenol A epoxy resin (Comparative Experiment A), the cured resin showed improvements in tensile and flexural modulus of 4.7 and 5.9%, respectively.

EXAMPLE 3

Cure of Diglycidyl Ether of Bisphenol A Epoxy Resin Advanced with N,N'-Diphenylterephthalamide (Orientation of Birefringent Segments with the Application of an Electric Field)

A diglycidyl ether of bisphenol A epoxy resin advanced with N,N'-diphenylterephthalamide (143.3 grams, 22.5% epoxide) is first heated to 160° C. Diethyltoluenediamine (34.86 grams, 1.04 times the stoichiometric amount of epoxide) is then added. After mixing, this resin system is poured into an aluminum mold (dimensions=8"×8"×⅛") heated to 120° C. in a convection oven. The mold consists of two aluminum plates spaced apart by an ⅛" silicone rubber gasket which forms the mold cavity. Prior to pouring of the resin system into the mold, a 300 volt charge is established between the two aluminum plates using a direct current power supply. After one hour at 120° C., the oven temperature is raised to 180° C. and held at this temperature for two hours. Following cool down from 180° C. to room temperature, a void free, neat resin casting is obtained from the mold. When this casting is viewed under an optical microscope using a crosspolarized light source, orientation of the birefringent segments produced through the advancement of diglycidyl ether of bisphenol A epoxy resin with N,N'-diphenylterephthalamide is observed. This orientation is normal to the electric field application. From this neat resin casting, glass transition temperature and mechanical properties are determined. These results are reported in Table I. Compared to the diglycidyl ether of bisphenol A epoxy resin (Comparative Experiment A), improvements in tensile and flexural modulus of 13.5 and 6.4% are observed, respectively.

EXAMPLE 4

Advancement of Diglycidyl Ether of Bisphenol A Epoxy Resin with N,N'-Diphenylterephthalamide and N-Phenylbenzamide N,N'-diphenylterephthalamide (9.0 grams) and N-phenylbenzamide (3.0 grams) are added to a stirred, 500 ml reaction flask containing 300.0 grams of diglycidyl ether of bisphenol A epoxy resin (24.5% epoxide). This mixture is then heated to 248° C. and held at this temperature for approximately 1.5 hours. The measured % epoxide of this advanced resin is 22.4 which compares to a calculated % epoxide of 22.3 based on complete reaction of the amide hydrogens of N,N'-diphenylterephthalamide and N-phenylbenzamide. After 1.5 hours at 248° C., the resin is cooled quickly to room temperature by pouring into a large aluminum pan. When this resin is viewed under an optical microscope (70× magnification) using a crosspolarized light source, dispersed birefringent areas are observed.

EXAMPLE 5

Cure of Diglycidyl Ether of Bisphenol A Epoxy Resin Advanced with N,N'-Diphenylterephthalamide and N-Phenylbenzamide Part of the advanced diglycidyl ether of bisphenol A epoxy resin of Example 4 (150.1 grams) is heated to 120° C. Diethyltoluenediamine (36.20 grams, 1.04 times the stoichiometric amount of epoxide) is then added. After mixing, this resin system is poured into an aluminum mold heated to 120° C. in a convection oven. The configuration of this aluminum mold is the same as in Example 3 and after pouring the resin into this mold, a 16 volt charge is established between the aluminum plates using a direct current power supply. After two hours at 120° C., the oven is raised to 180° C. and held for two hours at this temperature. Following cool down of the oven from 180° C. to room temperature, a void free, neat resin casting is obtained from the mold. When this casting is viewed under an optical microscope using a crosspolarized light source, dispersed birefringent particles are observed in the polymer. The glass transition temperature and mechanical properties for this casting are then determined and these results are reported in Table I. Compared to the diglycidyl ether of bisphenol A epoxy resin (Comparative Experiment A), the cured resin shows an improvement in tensile and flexural modulus of 9.7 and 15.2%, respectively.

EXAMPLE 6

Advancement of Diglycidyl Ether of Bisphenol A Epoxy Resin with 4'-Sulfonamido-N-Phenylbenzamide Thirty (30) grams of 4'-sulfonamido-N-phenylbenzamide are added to a stirred, 500 ml reaction flask containing 300.7 grams of diglycidyl ether of bisphenol A epoxy resin (24.4% epoxide). A sample of this mixture when viewed under an optical microscope (70× magnification) using a crosspolarized light source shows dispersed crystallites of 4'-sulfonamido-N-phenylbenzamide in the epoxy resin. This mixture is then heated. At 218° C., the mixture becomes clear and a small exotherm is observed. Following the exotherm, which peaks at 235° C., the resin is cooled to room temperature. At room temperature, no solids are observed. When viewed under the optical microscope, small birefringent areas are observed in the resin. The measured % epoxide of this resin is 18.5 which compares to a calculated % epoxide of 18.0 based on the complete reaction of all the active hydrogens of the 4'-sulfonamido-N-phenylbenzamide.

EXAMPLE 7

Advancement of Diglycidyl Ether of Bisphenol A Epoxy Resin with 4'-Sulfonamido-N-Phenyl-benzamide Forty-five (45) grams of 4'-sulfonamido-N-phenylbenzamide are added to a stirred, 500 ml reaction flask containing diglycidyl ether of bisphenol A epoxy resin (299.8 grams, 24.8% epoxide). This mixture is then heated. At 220° C. the mixture starts to clear and a small exotherm is observed. Following the exotherm, which peaks at 248° C., the resin is cooled to room temperature. At room temperature, no solids are observed in the resin. When viewed under an optical microscope (70× magnification) using a crosspolarized light source, small birefringent areas can be seen. The titrated % epoxide of this advanced resin is 16.3 which compares to a calculated % epoxide of 15.5 based on the complete reaction of all the active hydrogens of the 4'-sulfonamido-N-phenylbenzamide.

EXAMPLE 8

Cure of Diglycidyl Ether of Bisphenol A Epoxy Resin Advanced with 4'-Sulfonamido-N-Phenyl-benzamide Part of the resin obtained from Example 6 (145.8 grams) is heated to 120° C. Diethyltoluenediamine (29.1 grams, 1.04 times the stoichiometric amount of epoxide) is then added. After mixing, this resin system is poured into a mold (dimensions=8"×8"×⅛") heated to 120° C. in a convection oven. The temperature of the oven is then raised to 180° C. and held at this temperature for two hours. Following cool down of the oven from 180° C. to room temperature, a void free neat resin casting is obtained from the mold. The glass transition temperature and mechanical properties of this casting are then determined and these results are reported in Table II. Compared to the diglycidyl ether of bisphenol A epoxy resin (Comparative Experiment A), the cured resin shows improvements in tensile and flexural modulus of 10.9 and 9.3%, respectively.

EXAMPLE 9

Cure of Diglycidyl Ether of Bisphenol A Epoxy Resin Advanced with 4'-Sulfonamido-N-Phenylbenzamide (Orientation of Birefringent Segments with the Application of an Electric Field)

Part of the resin obtained from Example 6 (174.8 grams) is heated to 120° C. Diethyltoluenediamine (30.82 grams, 1.04 times the stoichiometric amount of epoxide) is then added. After mixing, this resin system is poured into an aluminum mold heated to 120° C. in a convection oven. The configuration of this mold is the same as in Example 3 and after pouring of the resin, a 16 volt charge is established between the aluminum plates using a direct current power supply. After two hours at 120° C., the oven temperature is raised to 180° C. After two hours at 180° C., the oven is cooled to room temperature and a void free, neat resin casting is obtained from the mold. When this casting is viewed under an optical microscope (120× magnification) using a crosspolarized light source, birefringent fibers are observed in the polymer. The glass transition temperature and mechanical properties for this casting are then determined and these results are reported in Table II. Compared to the diglycidyl ether of bisphenol A epoxy resin (Comparative Example A), the cured resin shows improvements in tensile and flexural modulus of 13.5 and 11.3%, respectively.

EXAMPLE 10

Cure of Diglycidyl Ether of Bisphenol A Epoxy Resin Advanced with 4'-Sulfonamido-N-Phenylbenzamide A diglycidyl Ether of Bisphenol A epoxy resin which had been advanced with 4'-sulfonamido-N-phenylbenzamide in the same manner as Example 6 is heated to 120° C. The weight of this advanced resin, which contains 18.7% epoxide, is 169.9 grams. Diethyltoluenediamine (34.21 grams, 1.04 times the stoichiometric amount of epoxide) is then added. After mixing, this resin system is poured into an aluminum mold heated to 120° C. in a convection oven. The configuration of this mold is the same as in Example 3. After pouring the resin into the mold, a 50 volt charge is established between the aluminum plates using a direct current power supply. After one hour at 120° C., the oven temperature is raised to 180° C. After two hours at 180° C., the oven is cooled to room temperature and a void free, neat resin casting is obtained from the mold. The glass transition temperature and mechanical properties for this casting are then determined and these results are reported in Table II. Compared to the diglycidyl ether of bisphenol A epoxy resin (Comparative Experiment A), the cured resin shows improvements in tensile and flexural modulus of 16.4 and 12.4%, respectively. In addition to achieving these higher moduli, the strain to failure for this polymer is equal to that of the control.

EXAMPLE 11

Cure of Diglycidyl Ether of Bisphenol A Epoxy Resin Advanced with 41-Sulfonamido-N-Phenylbenzamide Part of the resin from Example 7 (174.8 grams) is heated to 120° C. Diethyltoluenediamine (30.82 grams, 1.04 times the stoichiometric amount of epoxide) is then added. After mixing, this resin system is poured into an aluminum mold heated to 120° C. in a convection oven. The configuration of this mold is the same as in Example 3. After pouring the resin into the mold, a 300 volt charge is established between the aluminum plates using a direct current power supply. After one hour at 120° C., the temperature of the oven containing the mold is raised to 180° C. and held for two hours at this temperature. Following cool down of the oven from 180° C. to room temperature, a void free, neat resin casting is obtained from the mold. The glass transition temperature and mechanical properties for this casting are then determined and these results are reported in Table III. Compared to diglycidyl ether of bisphenol A epoxy resin advanced with bisphenol A (Comparative Experiment B), the cured resin shows improvements in tensile and flexural modulus of 17.9 and 18.5%, respectively.

EXAMPLE 12

Advancement of Diglycidyl Ether of Bisphenol A Epoxy Resin with Bis(4-Hydroxyphenyl)Terephthalate Followed by Cure with Diethyltoluenediamine bis(4-Hydroxyphenyl)terephthalate (9.01 grams) is mixed into 50.0 grams of the diglycidyl ether of bisphenol A epoxy resin containing 2500 ppm tetrabutylphosphonium acetate-acetic acid complex catalyst (70% by weight in methanol). This mixture, which is contained in a stirred flask, is then heated to 140° C. Prior to heating, DSC analysis of this mixture, shows a reaction exotherm beginning at 120° C. (peak temperature=170° C., $\Delta H = -64$ joules/gram). After three hours at 140° C., the temperature is reduced to 120° C. The resin at this point contains dispersed crystalline segments as observed by optical microscopy (70× magnification) using a crosspolarized light source. Diethyltoluenediamine (10.82 grams, 1.04 times the calculated stoichiometric amount of epoxide remaining after complete advancement) is then added. After mixing, this resin system is poured into an aluminum mold heated to 120° C. in a convection oven. The mold used is of the same configuration as used in Example 3. After pouring the resin into the mold, a 7 volt charge is applied between the two aluminum plates using a direct current power supply. The oven temperature is then raised to 180° C. where it is maintained for four hours. Following cool down of the oven from 180° C. to room temperature, a void free, translucent casting is obtained from the mold. The glass transition temperature of this polymer is 131° C. as determined by DSC which also indicates no additional reactivity to 300° C. The flexural strength and modulus for the casting are 17,680 psi and 463 ksi, respectively. Compared to diglycidyl ether of bisphenol A epoxy resin advanced with bisphenol A (Comparative Experiment B), the flexural modulus obtained represents a 16.9% improvement.

TABLE I

DIGLYCIDYL ETHER OF BISPENOL A EPOXY RESIN ADVANCED WITH N,N'-DIPHENYLTEREPHTHALAMIDE AND N-PHENYLBENZAMIDE - PROPERTIES FOR NEAT RESIN CURED WITH DIETHYLTOLUENEDIAMINE

| EXAMPLE NO. | Comp. Expt. A | 2 | 3 | 5 |
|---|---|---|---|---|
| Wt. % N,N'-Diphenylterephthalamide used in Advancement Reaction | 0 | 2.9 | 2.9 | 2.9 |
| Wt. % N-Phenylbenzamide used in Advancement Reaction | 0 | 0 | 0 | 0.96 |
| % Epoxide of Resin | 24.6 | 22.7 | 22.5 | 22.4 |
| Electric Field Applied During Cure, volts D.C. | 0 | 0 | 300 | 16 |
| Glass Transition Temperature, °C. | 179 | 173 | 169 | 165 |
| Tensile Strength, psi | 10,560 | 9,920 | 7,605 | 9.915 |
| Tensile Modulus, ksi | 340 | 356 | 386 | 373 |
| Strain to Failure, % | 5.3 | 3.8 | 2.4 | 3.9 |
| Flexural Strength, psi | 19,320 | 13,060 | 13,360 | 18,420 |
| Flexural Modulus, ksi | 388 | 411 | 413 | 447 |

TABLE II

DIGLYCIDYL ETHER OF BISPENOL A EPOXY RESIN ADVANCED WITH 4'-SULFONAMIDO-N-PHENYLBENZAMIDE - PROPERTIES FOR NEAT RESIN CURED WITH DIETHYLTOLUENEDIAMINE

| EXAMPLE NO. | Comp. Expt. A | 8 | 9 | 10 |
|---|---|---|---|---|
| Wt. % 4'-Sulfonamido-N-Phenylbenzamide used in Advancement Reaction | 0 | 9.1 | 9.1 | 9.1 |
| % Epoxide of Resin | 24.6 | 18.5 | 18.5 | 18.7 |
| Electric Field Applied During Cure, volts D.C. | 0 | 0 | 16 | 50 |
| Glass Transition Temperature, °C. | 179 | 168 | 166 | 167 |
| Tensile Strength, psi | 10,560 | 8,810 | 11,120 | 11,740 |
| Tensile Modulus, ksi | 340 | 377 | 386 | 416 |
| Strain to Failure, % | 5.3 | 3.1 | 4.8 | 5.2 |
| Flexural Strength, psi | 19,320 | 20,970 | 20,180 | 20,850 |

TABLE II-continued

DIGLYCIDYL ETHER OF BISPENOL A EPOXY RESIN ADVANCED WITH 4'-SULFONAMIDO-N-PHENYLBENZAMIDE - PROPERTIES FOR NEAT RESIN CURED WITH DIETHYLTOLUENEDIAMINE

| EXAMPLE NO. | Comp. Expt. A | 8 | 9 | 10 |
|---|---|---|---|---|
| Flexural Modulus, ksi | 388 | 424 | 432 | 436 |

TABLE III

DIGLYCIDYL ETHER OF BISPENOL A EPOXY RESIN ADVANCED WITH 4'-SULFONAMIDO-N-PHENYLBENZAMIDE - PROPERTIES FOR NEAT RESIN CURED WITH DIETHYLTOLUENEDIAMINE

| EXAMPLE NO. | Comp. Expt. B | 11 |
|---|---|---|
| Wt. % 4'-Sulfonamido-N-Phenylbenzamide used in Advancement Reaction | 0 | 18.4 |
| Wt. % Bisphenol A used in Advancement Reaction | 14.3 | 0 |
| % Epoxide of Resin | 16.3 | 16.3 |
| Electric Field Applied During Cure, volts D.C. | 0 | 300 |
| Glass Transition Temperature, °C. | 150 | 156 |
| Tensile Strength, psi | 11,100 | 11,510 |
| Tensile Modulus, ksi | 351 | 414 |
| Strain to Failure, % | 7.3 | 4.3 |
| Flexural Strength, psi | 19,460 | 22,360 |
| Flexural Modulus, ksi | 396 | 460 |

EXAMPLE 13

Advancement of the Diglycidyl Ether of Bisphenol A with N,N'-bis(4-hydroxyphenyl)terephthalamide and Preparation of a Compression Molded Phenoxy Resin Casting N,N'-bis(4-hydroxyphenyl)terephthalamide (30.7 grams; 0.176 hydroxyl equivalent) was blended into an equivalent amount of the diglycidyl ether of bisphenol A (30.0 grams, EEW=170.3, 0.176 epoxide equivalent) which contained 4500 ppm catalyst, tetrabutylphosphonium acetate-acetic acid complex (70 weight percent in methanol). This blend was then placed in a 130° C. convection oven where it was stirred approximately every 5 minutes. DSC analysis of a sample of this blend showed a reaction exotherm (ΔH= −120 joules/gram) with an onset temperature of 160° C. The peak temperature of this exotherm was 240° C. After 30 minutes at 130° C., the oven temperature was increased to 180° C. over a 1.5 hour period during which time periodic stirring was continued. After 30 minutes at 180° C. the thickened resin was removed from the oven and cooled to approximately 0° C. The cooled solid resin was then ground to a fine powder. For the preparation of a neat resin casting, part of this powder (54 grams) was placed in a compression mold (dimensions=4"×4"×0.125"; 101.6 mm×101.6 mm×3.18 mm). This compression mold was next transferred to a mechanical press heated to 220° C. In the press, pressure (1680 psi) was applied to the mold during the first 5 minutes. After 1.5 hours at 220° C., the temperature of the press was increased to 240° C. where it was maintained for 1.5 hours before cooling to room temperature. At room temperature, an opaque, neat resin casting was obtained from the mold. The melting point of this polymer was 378° C. as determined by DSC. The flexural strength and modulus for the neat resin casting obtained were 8440 psi and 713 ksi, respectively.

What is claimed is:

1. An advanced resin composition prepared by reacting
   (A) at least one epoxy resin having an average of more than one vicinal epoxy group per molecule; with
   (B) at least one compound having an average of more than one active hydrogen atom and one or more mesogenic moieties per molecule represented by the following Formulas I, II or III

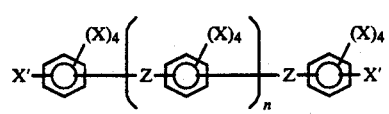

Formula I

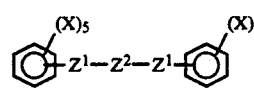

Formula II

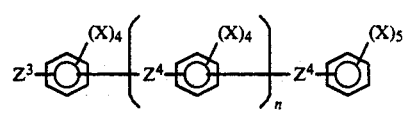

Formula III wherein each X is independently hydrogen, a hydrocarbyl or hydrocarbyloxy group having from 1 to about 12 carbon atoms, a halogen atom, —NO₂ or —C≡N; each X' is independently a hydroxyl group, a carboxylic acid group or the group represented by Formula IV

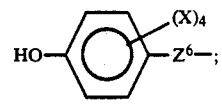

Formula IV each Z is independently —CR¹=CR¹—, —CR¹=CR¹—CR¹=CR¹—, —CR¹=N—N=C-R¹—, —CR¹=CR¹—CO—O—CH₂—, —CR¹=CR¹—CO—O—CH₂—CH₂—, —CH₂—O—CO—CR¹=CR¹—, —CH₂—CH₂—O—CO—CR¹=CR¹—, —CR¹=C-R¹—CO—O—, —O—CO—CR¹=CR¹—, —N=N—, —CO—NR¹—, —NR¹—CO—, —CO—NR¹—NR¹—CO—, —C≡C—, —C≡C—C≡C—, —CO—S—, —S—CO—, —CO—O—, —O—CO—, —CR¹=C-R¹—O—CO—CH₂—CH₂, —CH₂-CO—O—CR¹=CR¹—, —CR¹=C-R¹—O—CO—CH₂—CH₂—, —CH₂—CH-₂—CO—O—CR¹=CR¹—, —CH₂—CH-₂—CO—O—, —O—CO—CH₂—CH₂—, —CO—O—CR¹=CR¹—, —CR¹=C-R¹—O—CO—, a direct single bond when n≧1,

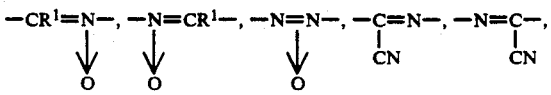

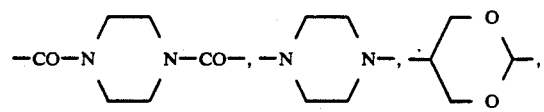

-continued

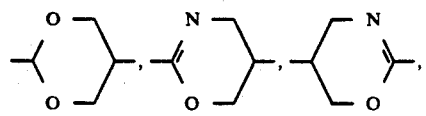

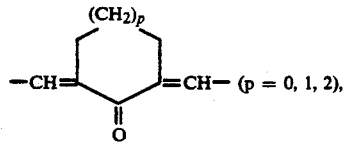

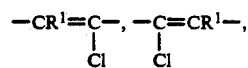

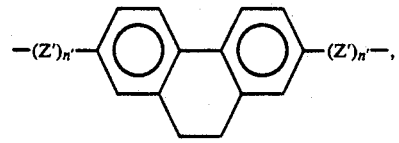

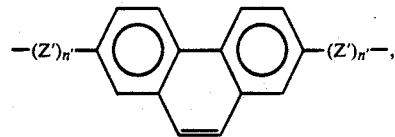

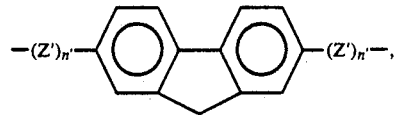

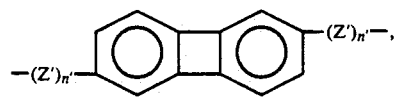

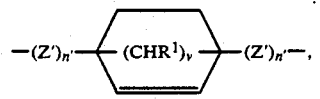

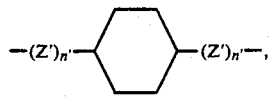

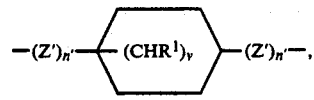

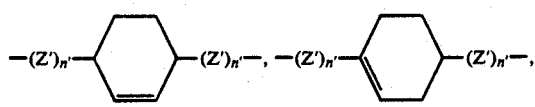

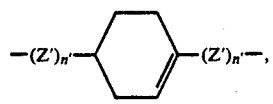

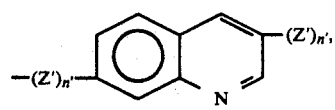

-continued

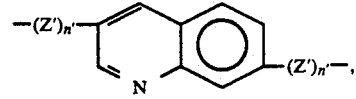

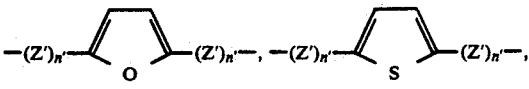

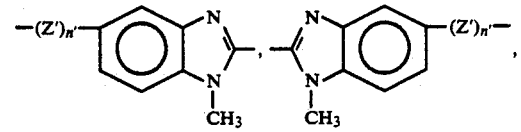

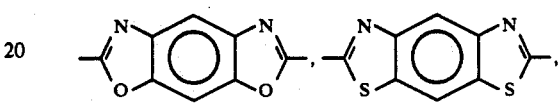

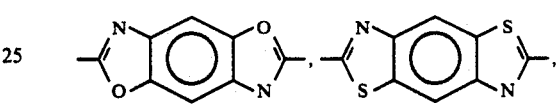

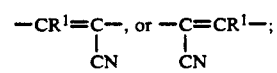

$Z'$ is independently $-O-CO-$, $-CO-O-$, $-NR^1-CO-$, or $-CO-NR^1-$; each $n'$ is independently zero or 1; $R^1$ is independently a hydrogen atom or an alkyl group having from 1 to about 4 carbon atoms; $Z^6$ is a divalent hydrocarbyl group having from 1 to about 12 carbon atoms, $-SO-$, $-SO_2-$, $-S-$, $-S-S-$, $-O-$, or $-CO-$; each $Z^1$ is independently $-CO-NH-$, or $-NH-CO-$; $Z^2$ is a group represented by a cyclic or bicyclic ring system containing from 5 to about 12 carbon atoms or a group represented by Formula V;

Formula V

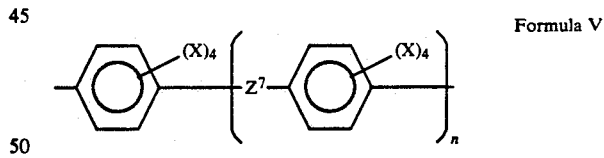

$Z^3$ is $NH_2-$, $NH_2-SO_2-$, $NH_2-CO-$, $NH_2-Z^5-O-CO-$, or $NH_2-Z^5-O-$; each $Z^4$ is independently $-CR^1=CR^1-$, $-CR^1=CR^1-CR^1=CR^1-$, $-CR^1=N-N=CR^1-$, $-CR^1=CR^1-CO-O-CH_2-$, $-CR^1=CR^1-CO-O-CH_2-CH_2-$, $-CH_2-O-CO-CR^1=CR^1-$, $-CH_2-CH_2-O-CO-CR^1=CR^1-$, $-CR^1=CR^1-CO-O-$, $-O-CO-CR^1=CR^1-$, $-N=N-$, $-CO-NR^1-$, $-NR^1-CO-$, $-CO-NR^1-NR^1-CO-$, $-C\equiv C-$, $-C\equiv C-C\equiv C-$, $-CO-S-$, $-S-CO-$, $-CR^1=N-$, $-N=CR^1-$, $-CO-O-$, $-O-CO-$, $-CR^1=CR^1-O-CO-CH_2-$, $-CH_2-CO-O-CR^1=CR^1-$, $-CR^1=CR^1-O-CO-CH_2-CH_2-$, $-CH_2-CH_2-CO-O-CR^1=CR^1-$, $-CH_2-CH- 2—CO—O—, —O—CO—CH₂—CH₂—,
—CO—O—CR¹=CR¹—, —CR¹=C-
R¹—O—CO—, a direct single bond,

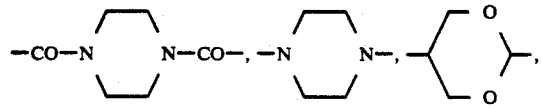

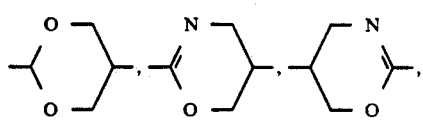

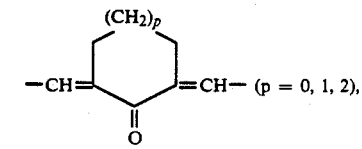

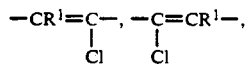

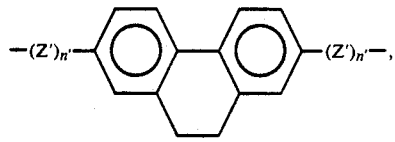

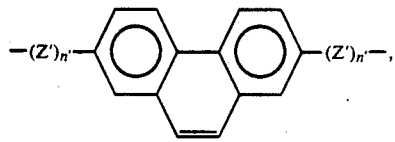

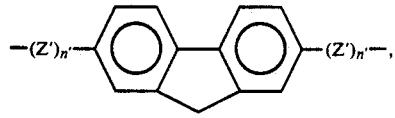

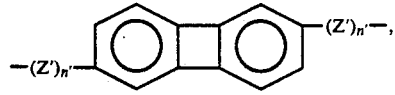

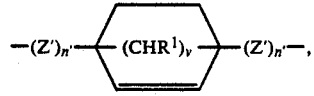

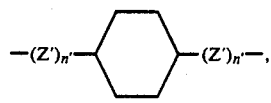

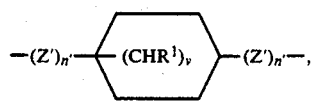

-continued

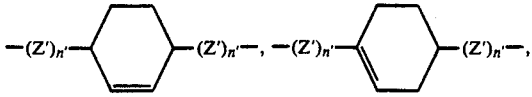

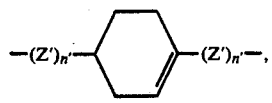

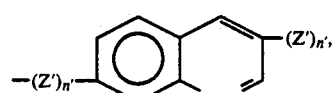

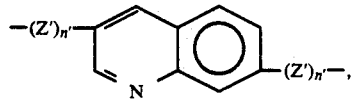

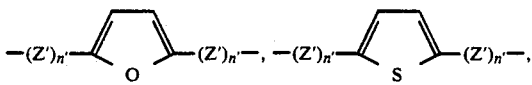

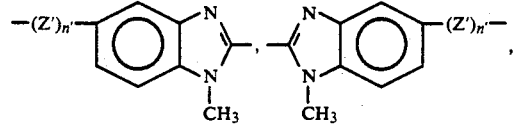

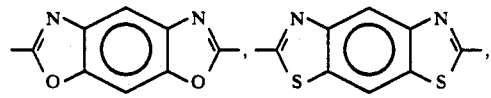

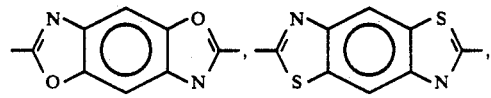

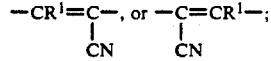

$Z^5$ is an alkylene or cycloalkylene group having from 1 to about 10 carbon atoms; $Z^7$ is the same as $Z^4$ with the proviso that it can also independently be a divalent hydrocarbyl group having from 1 to about 4, carbon atoms, —SO—, —SO₂—, —S—, —S—S—, —O—, or —CO—; v has a value of 1 or 2, and n has an average value of zero to about 6;

wherein components (A) and (B) are meltable or soluble at the reaction conditions and are employed in amounts which provide a ratio of active hydrogen atoms per vicinal epoxy group of from about 0.01:1 to about 1.05:1;

with the proviso that
(a) at least about 80 percent of the Z and X' groups are in the para position with respect to each other in Formula I, and
(b) at least about 80 percent of the $Z^3$ and $Z^4$ groups are in the para position with respect to each other in Formula III,
(c) component (B) cannot be a compound represented by the formula

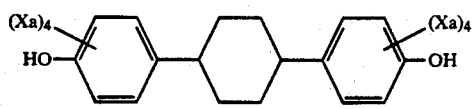

wherein each $X^a$ is independently hydrogen, hydroxyl, a nitro, alkyl, aryl, alkaryl, aralkyl, halo-

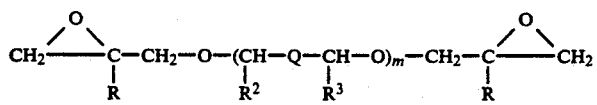

FORMULA VI

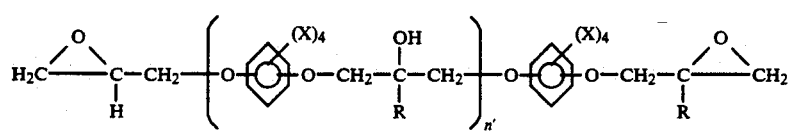

FORMULA VII

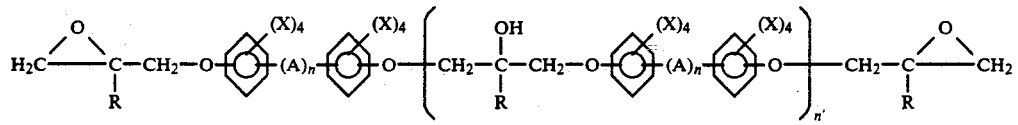

FORMULA VIII

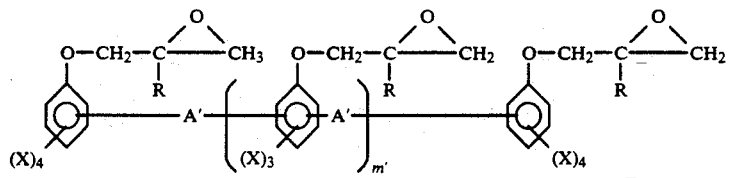

FORMULA IX

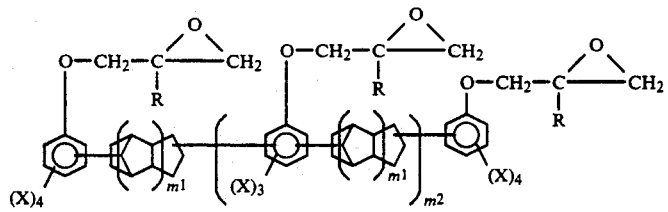

FORMULA X gen, alkoxy alkaryloxy, aralkyloxy or aryloxy group;

(d) when component (B) is a compound represented by Formula III wherein $Z^3$ is $NH_2$—$Z_5$—O— or $NH_2$—$Z_5$—O—CO—, $Z_5$ is an alkylene group having from 1 to 10 carbon atoms, $Z^4$ is a direct single bond, n has a value of zero, X is hydrogen at all occurrences with the proviso that the single X substituent on the aromatic ring not substituted by $Z^3$ para to the direct single bond is —$NO_2$ or —CN and with the proviso that $Z^3$ is para to the direct single bond, components (A) and (B) are employed in amounts which provide a ratio of amine hydrogen atoms per vicinal epoxy group of from about 0.01:1 to about 0.5:1.

2. An advanced resin composition of claim 1 wherein components (A) and (B) are employed in amounts which provide a ratio of active hydrogen atoms per vicinal epoxy group of from about 0.96:1 to about 1.05:1.

3. An advanced resin composition of claim 1 wherein components (A) and (B) are employed in amounts which provide a ratio of active hydrogen atoms per vicinal epoxy group of from about 0.01:1 to about 0.95:1.

4. An advanced resin composition of claim 1 wherein components (A) and (B) are employed in amounts which provide a ratio of active hydrogen atoms per vicinal epoxy group of from about 0.01:1 to about 0.5:1.

5. An advanced resin composition of claims 2 or 3 wherein
(i) component A is an epoxy resin represented by the following Formulas VI, VII, VIII, IX or X wherein each A is independently a divalent hydrocarbyl group having from 1 to about 12 carbon atoms, —O—, —S—, —S—S—, —SO—, —$SO_2$—, or —CO—; each A' is independently a divalent hydrocarbon group having from 1 to about 6 carbon atoms; Q is a single bond, —$CH_2$—S—$CH_2$—, —$(CH_2)_{n1}$—, or

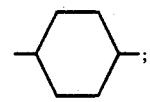

each R is independently hydrogen or an alkyl group having from 1 to about 4 carbon atoms; each $R^2$ and $R^3$ is independently hydrogen, a hydrocarbyl or halohydrocarbyl group having from 1 to about 6 carbon atoms; each X is independently hydrogen, a hydrocarbyl or hydrocarbyloxy group having from 1 to about 12 carbon atoms, a halogen atom, —$NO_2$ or —C≡N; m has a value from about 1 to about 10; m' has a value from about 0.01 to about 12; $m^1$ has an average value from about 1 to about 12; $m^2$ has a value from about 1 to about 12; n has a value of zero or 1; n' has an average value from about zero to about 3; and $n^1$ has an average value from about 1 to about 10; and (ii) component (B) is a compound represented by Formula I wherein each X is independently hydrogen, a hydrocarbyl or hydrocarbyloxy group containing from 1 to about 6 carbon atoms, a halogen atom or a —$NO_2$ or —C≡N group; each Z is independently —N=N—, —CO—$NR^1$—, —$NR^1$—CO—, —CO—O—, —O—CO—, —$CR^1$=$CR^1$—,

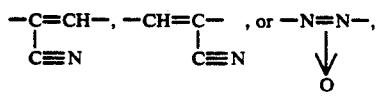

where each $R^1$ is independently a hydrogen atom or an alkyl group having from 1 to about 4 carbon atoms; and each $Z^6$ is independently a divalent hydrocarbyl group having from 1 to about 12 carbon atoms, —SO—, —$SO_2$—, —S—, —S—S—, —O—, or —CO—.

6. An advanced resin composition of claim 5 wherein
(i) in component (A) each A is independently a divalent hydrocarbyl group having from 1 to about 6 carbon atoms, —O—, —S—, —S—S—, —SO—, —$SO_2$—, or —CO—; each A' is independently a divalent hydrocarbon group having from 1 to about 3 carbon atoms; each $R^2$ and $R^3$ is independently hydrogen, a hydrocarbyl or halohydrocarbyl group having from 1 to about 3 carbon atoms; each X is independently hydrogen, a hydrocarbyl or hydrocarbyloxy group having from 1 to about 6 carbon atoms, chlorine or bromine, —$NO_2$ or —C≡N; m has a value from about 1 to about 4; m' has a value from about 1 to about 6; $m^1$ has an average value from about 1 to about 6; $m^2$ has a value from about 2 to about 6; n has a value of zero or 1; and n' has an average value from about zero to about 1.5; and (ii) component (B) is a compound represented by Formula I wherein each X is independently hydrogen, a hydrocarbyl or hydrocarbyloxy group containing from 1 to about 4 carbon atoms, chlorine or bromine or a —$NO_2$ or —C≡N group; each X' is a hydroxyl group.

7. An advanced resin composition of claim 6 wherein:
(i) in component (A) each A is independently a divalent hydrocarbyl group having from 1 to about 3 carbon atoms, —O—, —S—, —S—S—, —SO—, —$SO_2$—, or —CO—; each A' is independently a divalent hydrocarbon group having from 1 to about 3 carbon atoms; each $R^2$ and $R^3$ is independently hydrogen, a hydrocarbyl or halohydrocarbyl group having from 1 to about 2 carbon atoms; each X is independently hydrogen, a hydrocarbyl or hydrocarbyloxy group having from 1 to about 4 carbon atoms, bromine, —$NO_2$ or —C≡N; m has a value from about 1 to about 2; m' has a value from about 1 to about 3; $m^1$ has an average value from about 1 to about 3; $m^2$ has a value from about 2 to about 3; n has a value of 1; and n' has an average value from about zero to about 0.5;

(ii) component (B) is bis(4-hydroxyphenyl)terephthalate or N,N'-bis(4-hydroxyphenyl)terephthalamide.

8. An advanced resin composition of claims 2 or 3 wherein
(i) component A is an epoxy resin represented by the following Formulas VI, VII, VIII, IX or X

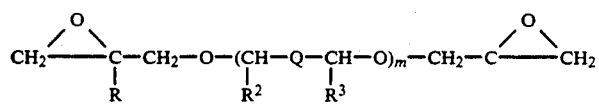

FORMULA VI

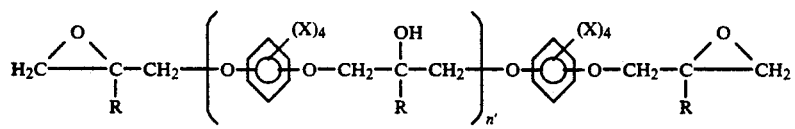

FORMULA VII

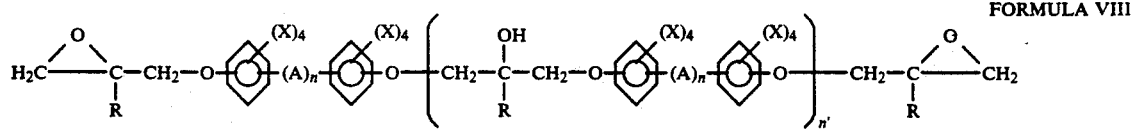

FORMULA VIII

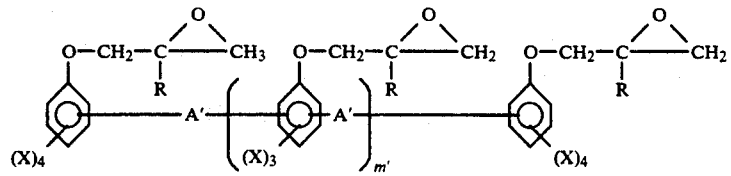

FORMULA IX

-continued

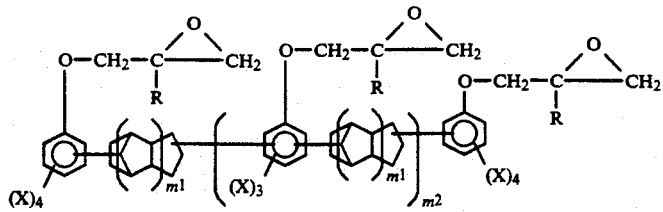

wherein each A is independently a divalent hydrocarbyl group having from 1 to about 12 carbon atoms, —O—, —S—, —S—S—, —SO—, —SO$_2$—, or —CO—; each A' is independently a divalent hydrocarbon group having from 1 to about 6 carbon atoms; Q is a single bond, —CH$_2$—S—CH$_2$—, —(CH$_2$)$_{n1}$—, or

each R is independently hydrogen or an alkyl group having from 1 to about 4 carbon atoms; each R$^2$ and R$^3$ is independently hydrogen, a hydrocarbyl or halohydrocarbyl group having from 1 to about 6 carbon atoms; each X is independently hydrogen, a hydrocarbyl or hydrocarbyloxy group having from 1 to about 12 carbon atoms, a halogen atom, —NO$_2$ or —C≡N; m has a value from about 1 to about 10; m' has a value from about 0.01 to about 12; m$^1$ has an average value from about 1 to about 12; m$^2$ has a value from about 1 to about 12; n has a value of zero or 1; n' has an average value from about zero to about 3; and n$^1$ has an average value from about 1 to about 10; and (ii) component (B) is a compound represented by Formula II wherein each X is independently hydrogen, a hydrocarbyl or hydrocarbyloxy group containing from 1 to about 6 carbon atoms, a halogen atom or a —NO$_2$ or —C≡N group; each Z$^1$ is independently —CO—NH— or —NH—CO—; each Z$^2$ is independently a cyclic or bicyclic ring system containing from 5 to about 10 carbon atoms or a group represented by Formula V; and each Z$^7$ is independently a divalent hydrocarbyl group having from 1 to about 12 carbon atoms, —SO—, —SO$_2$—, —S—, —S—S— —O—, —CO—, —N=N—, —CO—NR$^1$—, —NR$^1$—CO—, —CO—O—, —O—CO—, —CR$^1$=CR$^1$—,

FORMULA X

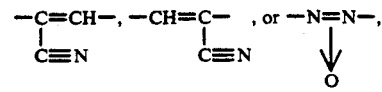

where each R$^1$ is independently hydrogen or an alkyl group having from 1 to about 4 carbon atoms; and n has a value from zero to about 6.

9. An advanced resin composition of claim 8 wherein component (B) is a compound represented by Formula II wherein each X is independently hydrogen, a hydrocarbyl or hydrocarbyloxy group containing from 1 to about 4 carbon atoms, chlorine or bromine or a —NO$_2$ or —C≡N group; and each Z$^2$ is independently a cyclic ring system containing from 5 to about 10 carbon atoms or a group represented by Formula V.

10. An advanced resin composition of claim 9 wherein
   (i) in component (A) each A is independently a divalent hydrocarbyl group having from 1 to about 3 carbon atoms, —O—, —S—, —S—S—, —SO—, —SO$_2$—, or —CO—; each A' is independently a divalent hydrocarbon group having from 1 to about 3 carbon atoms; each R$^2$ and R$^3$ is independently hydrogen, a hydrocarbyl or halohydrocarbyl group having from 1 to about 2 carbon atoms; each X is independently hydrogen, a hydrocarbyl or hydrocarbyloxy group having from 1 to about 4 carbon atoms, bromine, —NO$_2$ or —C≡N; m has a value from about 1 to about 2; m' has a value from about 1 to about 3; m$^1$ has an average value from about 1 to about 3; m$^2$ has a value from about 2 to about 3; n has a value of 1; and n' has an average value from about zero to about 0.5;
   (ii) component (B) is N,N'-diphenylterephthalamide or a mixture of N,N'-diphenylterephthalamide and N-phenylbenzamide.

11. An advanced resin composition of claims 2 or 3 wherein
   (i) component A is an epoxy resin represented by the following Formulas VI, VII, VIII, IX or X

FORMULA VI

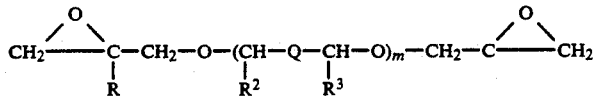

FORMULA VII

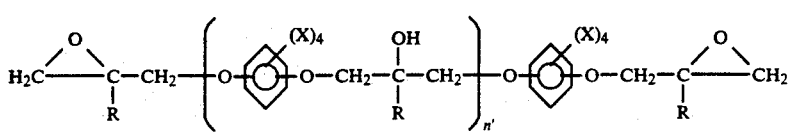

FORMULA VIII

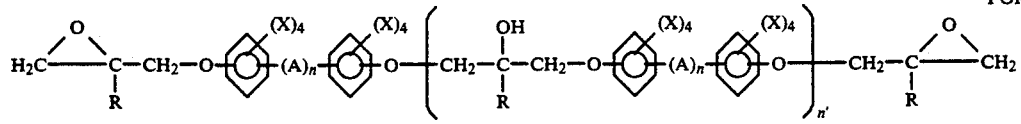

FORMULA IX

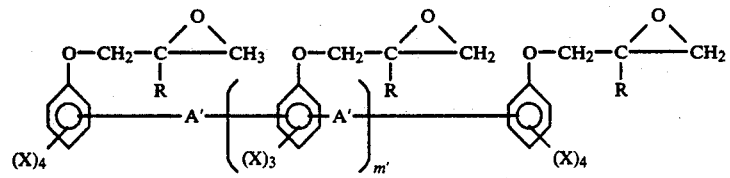

FORMULA X

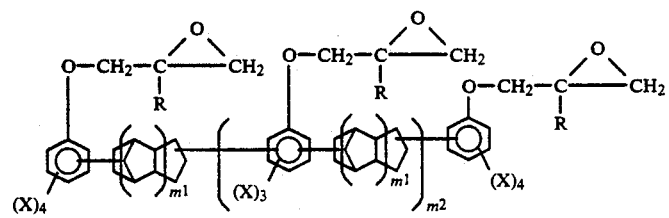

wherein each A is independently a divalent hydrocarbyl group having from 1 to about 12 carbon atoms, —O—, —S—, —S—S—, —SO—, —SO$_2$—, or —CO—; each A' is independently a divalent hydrocarbon group having from 1 to about 6 carbon atoms; Q is a single bond, —CH$_2$—S—CH$_2$—, —(CH$_2$)$_{n1}$—, or

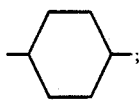

each R is independently hydrogen or an alkyl group having from 1 to about 4 carbon atoms; each R$^2$ and R$^3$ is independently hydrogen, a hydrocarbyl or halohydrocarbyl group having from 1 to about 6 carbon atoms; each X is independently hydrogen, a hydrocarbyl or hydrocarbyloxy group having from 1 to about 12 carbon atoms, a halogen atom, —NO$_2$ or —C≡N; m has a value from about 1 to about 10; m' has a value from about 0.01 to about 12; m$^1$ has an average value from about 1 to about 12; m$^2$ has a value from about 1 to about 12; n has a value of zero or 1; n' has an average value from about zero to about 3; and n$^1$ has an average value from about 1 to about 10; and (ii) component (B) is a compound represented by Formula III wherein each X is independently hydrogen, a hydrocarbyl or hydrocarbyloxy group containing from 1 to about 6 carbon atoms, a halogen atom or a —NO$_2$ or —C≡N group; each Z$^3$ is independently NH$_2$— or NH$_2$—SO$_2$—; and each Z$^4$ is independently —N=N—, —CO—NR$^1$—, —NR$^1$—CO—, —CO—O—, —O—CO—, —CR$^1$=CR$^1$—,

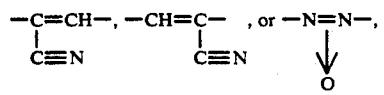

where each R$^1$ is independently a hydrogen atom or an alkyl group having from 1 to about 4 carbon atoms.

12. An advanced resin composition of claim 11 wherein (i) in component (A) each A is independently a divalent hydrocarbyl group having from 1 to about 6 carbon atoms, —O—, —S—, —S—S—, —SO—, —SO$_2$—, or —CO—; each A' is independently a divalent hydrocarbon group having from 1 to about 3 carbon atoms; each R$^2$ and R$^3$ is independently hydrogen, a hydrocarbyl or halohydrocarbyl group having from 1 to about 3 carbon atoms; each X is independently hydrogen, a hydrocarbyl or hydrocarbyloxy group having from 1 to about 6 carbon atoms, chlorine or bromine, —NO$_2$ or —C≡N; m has a value from about 1 to about 4; m' has a value from about 1 to about 6; m$^1$ has an average value from about 1 to about 6; m$^2$ has a value from about 2 to about 6; n has a value of zero or 1; and n' has an average value from about zero to about 1.5; and (ii) component (B) is a compound represented by Formula III wherein each X is independently hydrogen, a hydrocarbyl or hydrocarbyloxy group containing from 1 to about 4 carbon atoms, chlorine or bromine or a —NO$_2$ or —C≡N group.

13. An advanced resin composition of claim 12 wherein (i) in component (A) each A is independently a divalent hydrocarbyl group having from 1 to about 3 carbon atoms, —O—, —S—, —S—S—, —SO—, —SO$_2$—, or —CO—; each A' is independently a divalent hydrocarbon group having from 1 to about 3 carbon atoms; each R$^2$ and R$^3$ is independently hydrogen, a hydrocarbyl or halohydrocarbyl group having from 1 to about 2 carbon atoms; each X is independently hydrogen, a hydrocarbyl or hydrocarbyloxy group having from 1 to about 4 carbon atoms, bromine, —NO$_2$ or —C≡N; m has a value from about 1 to about 2; m' has a value from about 1 to about 3; m$^1$ has an average value from about 1 to about 3; m$^2$ has a value from about 2 to about 3; n has a value of 1; and n' has an average value from about zero to about 0.5; and (ii) component (B) is 4'-sulfonamido-N-phenylbenzamide.

14. The advanced resin composition of claim 2 which has been subjected during processing to an electric field, magnetic field, drawing and/or shear flow.

15. The advanced resin composition of claims 1, 3 or 4 which has been subjected during processing to an electric field, magnetic field, drawing and/or shear flow.

16. The advanced resin composition of claim 5 which has been subjected during processing to an electric field, magnetic field, drawing and/or shear flow.

17. The advanced resin composition of claim 6 which has been subjected during processing to an electric field, magnetic field, drawing and/or shear flow.

18. The advanced resin composition of claim 7 which has been subjected during processing to an electric field, magnetic field, drawing and/or shear flow.

19. The advanced resin composition of claim 8 which has been subjected during processing to an electric field, magnetic field, drawing and/or shear flow.

20. The advanced resin composition of claim 9 which has been subjected during processing to an electric field, magnetic field, drawing and/or shear flow.

21. The advanced resin composition of claim 10 which has been subjected during processing to an electric field, magnetic field, drawing and/or shear flow.

22. The advanced resin composition of claim 11 which has been subjected during processing to an electric field, magnetic field, drawing and/or shear flow.

23. The advanced resin composition of claim 12 which has been subjected during processing to an electric field, magnetic field, drawing and/or shear flow.

24. The advanced resin composition of claim 13 which has been subjected during processing to an electric field, magnetic field, drawing and/or shear flow.

* * * * *

UNITED STATES PATENT AND TRADEMARK OFFICE
CERTIFICATE OF CORRECTION

PATENT NO. : 5,270,406

DATED : December 14, 1993

INVENTOR(S) : Jimmy D. Earls et al.

It is certified that error appears in the above-identified patent and that said Letters Patent is hereby corrected as shown below:

In claim 1, column 24, line 51, "$CH_2-CH_2$," should read -- $CH_2-$, --.

In claim 1, column 27, line 55, the formula should be

--

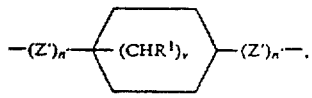

--.

In claim 1, column 27, line 65, the formula should be

--

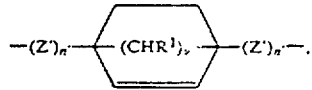

--.

UNITED STATES PATENT AND TRADEMARK OFFICE
CERTIFICATE OF CORRECTION

PATENT NO. : 5,270,406
DATED : December 14, 1993
INVENTOR(S) : Jimmy D. Earls et al.

It is certified that error appears in the above-identified patent and that said Letters Patent is hereby corrected as shown below:

In claim 5, column 30, line 5, "claims" should be --claim--.

In claim 8, column 31, in formula VI the forumula should be --

--.

UNITED STATES PATENT AND TRADEMARK OFFICE
CERTIFICATE OF CORRECTION

PATENT NO. : 5,270,406

DATED : December 14, 1993

INVENTOR(S) : Jimmy D. Earls, et al

It is certified that error appears in the above-indentified patent and that said Letters Patent is hereby corrected as shown below:

In claim 11, column 33, in formula VI the formula should be --

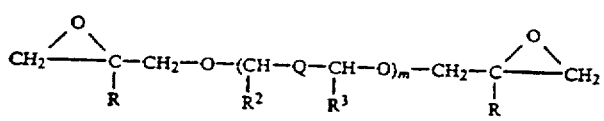

--.

In claim 13, column 36, line 66 "I" should be --i--.

Signed and Sealed this

Sixth Day of September, 1994

Attest:

BRUCE LEHMAN

Attesting Officer      Commissioner of Patents and Trademarks